Sept. 27, 1966  A. W. GAUBATZ  3,275,243

EXHAUST NOZZLE FLUID SEAL

Filed Dec. 28, 1961

INVENTOR.
BY Arthur W. Gaubatz
Robert E. McCollum
ATTORNEY

3,275,243
EXHAUST NOZZLE FLUID SEAL

Arthur W. Gaubatz, Indianapolis, Ind., assignor to General Motors Corporation, Detroit, Mich., a corporation of Delaware
Filed Dec. 28, 1961, Ser. No. 164,212
5 Claims. (Cl. 239—265.35)

This invention relates to a heat dam and gas seal. More particularly, it relates to means to prevent a burnout of a vectoring nozzle gas seal.

In vectoring or swivel type nozzles, the running clearance between the stationary and vectoring nozzle portions provides a passage through which gas can escape from the nozzle. This not only causes a loss in efficiency and thrust, but also immediately subjects the gimbal or trunnion mounts and other parts to the intense heat of the exhaust gases resulting in an eventual burnout of these parts and failure of the nozzle to vector properly. A gas seal is therefore generally provided in this area to positively prevent this leak of gas. However, known seal materials can withstand such intense heat for only a short period, and it therefore becomes necessary to provide a heat dam upstream from the seal to insulate the seal from the exhaust gas heat for as long as possible. It is a heat dam and gas seal with which the present invention is concerned.

Therefore, it is an object of this invention to provide a heat dam and fluid seal for a vectoring type exhaust nozzle to insulate the nozzle seal against the exhaust gas heat.

It is a further object of the invention to provide a heat dam and fluid seal for a vectoring type nozzle consisting of a flexible multi-ply corrugated ring member extending radially across the clearance passage between nozzle portions and loaded into sealing contact with the portions.

Other objects, features and advantages will become apparent upon reference to the succeeding detailed description of the invention and to the drawings illustrated the preferred embodiment thereof; wherein, FIGURE 1 is a side elevational view with parts broken away and in section of a vectoring nozzle embodying the invention;

In general, the invention is concerned with providing a vectoring type nozzle with heat dam and gas seal means to insulate the main nozzle gas seal from the extreme heat of the exhaust gases for as long a period of time as operation of the nozzle is required. This means consists of a multi-ply ring surrounding and slidably retained in a groove in the vectoring nozzle portion and extending across the clearance passage between portions to contact the stationary nozzle portion. Each of the plies consists of an annular metal sheet corrugated in a circumferential direction. The corrugations are inclined with respect to radial lines through the corrugations, with the corrugations of abutting plies being inclined in opposite directions. This provides a seal flexible in two directions to seal both radially and axially.

Figure 1:
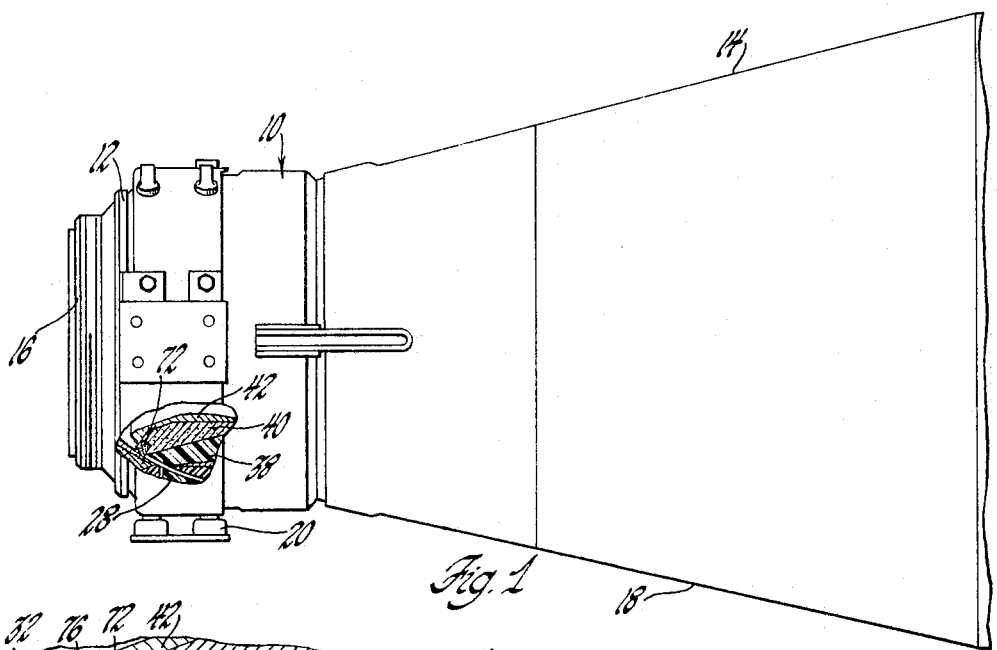

More specifically, FIG. 1 shows a vectoring or swivel nozzle 10 in its unvectored position having a stationary portion 12 and a vectoring portion 14. The stationary portion is adapted in this case to be secured to the converging conical end of a rocket case (not shown) by the screw threads 16 to form a rocket motor. It will be clear, however, that the nozzle would have use in many installations other than a rocket. The vectoring nozzle portion 14 is formed with a diverging conical exit portion 18 and is pivotally connected to the stationary portion by a gimbal ring type mount indicated generally at 20. The gimbal mount permits a full 360° positioning of the vectoring portion. The vectoring and stationary portions together define a convergent-divergent gas passage through the nozzle with a throat section between.

The nozzle stationary portion 12 consists of an outer sectioned casing 22 of stainless steel or the like lined with a ring of heat resistant plastic insulation 24, such as Refrasil, for example. For assembly purposes, the insulation 24 is sectioned in two parts 26 and 28 cemented or otherwise joined together at assembly. To the Refrasil is cemented or otherwise bonded a thick annular shell 30 of greater heat resistant insulating material, such as graphite. The fabrication of this nozzle portion is finally completed by cementing or otherwise bonding a liner 32 of high heat resistant material to the shell 30. The liner could be of plasma tungsten, for example. The liner 32 and insulation 28 have internal contours formed to the shape desired for the conically converging portion of the gas passage and the spherical surface 34 necessary for vectoring clearance of the nozzle movable portion.

The nozzle vectoring portion, like the stationary portion, consists of an outer annular casing 36 of stainless steel or the like to which is bonded a ring 38 of plastic insulating material, such as, again, Refrasil. The Refrasil in turn is lined with a thicker annular block 40 of higher heat resistant material, such as graphite. Finally, an annular liner 42 of, say, plasma tungsten, is cemented to the graphite ring to line the throat of the nozzle. The internal surface of liner 42 is made smooth and streamlined to diminish the heat and friction losses, and is contoured to provide the desired convergent-divergent shape to this portion of the gas passage. Also, as shown, the upstream edges of the throat liner 42 and rings 40 and 38 are beveled or contoured to provide substantially a smoothly rounded spherical surface 44 for cooperation with the socket-like surface 34 of the nozzle stationary portion 12. The cooperating contours of surfaces 34 and 44 thus provide a noninterfering close sliding fit between the nozzle portions.

This construction provides the necessary running clearance between the stationary and vectoring portions, but it also, however, provides a passage 46 through which the exhaust gases can leak out of the nozzle. A bag type seal 48 therefore is used to bridge the gap between the nozzle portions to prevent this. Briefly, seal 48 comprises an annular rolling fabric seal member 50 having beaded ends 52 and 54. The ends are separately secured to stationary and movable annular nozzle retaining members 56 and 58 by lip flanges 60 and 62 and spanner nuts 64 and 66. The retaining members 56 and 58 are either joined to or are formed as parts of the casings 22 and 36, respectively. An annular filler strip 68 of insulation secured to the retaining member 58 has a spherical external contour to match that of surface 44.

The bag seal is designed to positively prevent the leak of gases from the nozzle with the bearing area and is capable of withstanding high heat. The bag seal also permits the use of more conventional heat resistant insulating material in this area. However, the heat of the exhaust gases (5500°–6000° F. for example) and the concentration of these gases against the seal is so intense that the fabric member 50 will burn out if exposed to these hot gases for any length of time. Therefore, a heat dam 72 is provided upstream of the seal to protect it for as long a period as operation of the nozzle is required. Once nozzle operation is substantially completed, it is immaterial whether or not the bag seal is burned out by the exhaust gases.

Heat dam 72 comprises in general a flexible fluid ring seal surrounding the nozzle portion. The seal is slidably seated in an annular groove 74 having walls defined by the outer surface 76 of liner 42 and a circumferential undercut 78 in the insulating ring 40, and extends across the passage 46 into rubbing contact with surface 34 of liner 32.

Figure 2:
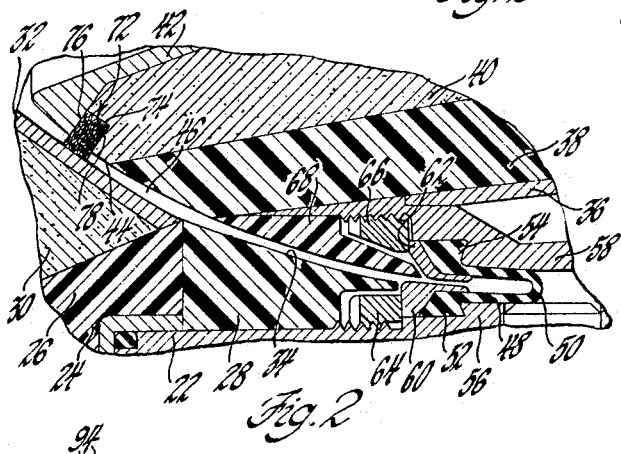
FIGURE 2 is an enlarged view of details of FIG. 1.
Figure 5:
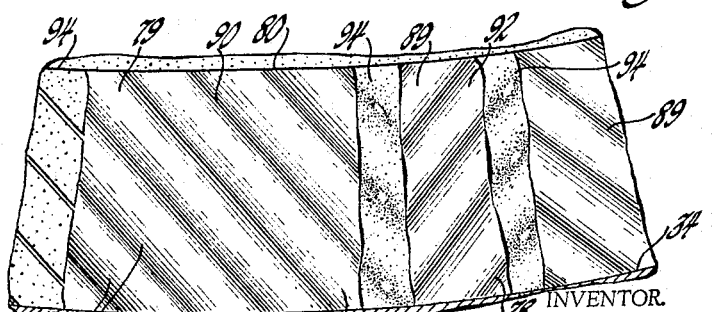

More specifically, the seal 72 consists of a laminated or multi-ply ring having, in this instance, six annular plies, each ply comprising a strip 78 pleated or corrugated in a circumferential direction. The strips can be readily formed from thin sheets of tungsten or the like. The strips are slidably positioned in the groove 74 along their minor axes with one edge 80 abutting the end wall 82 of the groove, and the opposite sides 84 and 86 of the assembled ring sealingly engaging the other groove walls (FIG. 2). The opposite edges 88 of the strips slidably engage surface 34 to prevent the leak of gas through passage 46 at this point. The corrugations 89 of each strip are inclined (FIG. 5) at an angle of say, forty-five degrees, for example, with respect to a radial line from the axis of the seal, and at assembly, the strips are axially stacked so that the corrugations of abutting strips 90 and 92 are inclined in an opposite direction.

The strips are originally installed in groove 74 and against surface 34 in a slightly compressed manner. Therefore, any growth either thermally due to the heat of operation of the nozzle or by the pressure of the exhaust gases acting at right angles to the strips, merely seats the strips more firmly in the groove and against the sealing surfaces. This is because the inclination of the corrugations of the strips causes the strips to attempt to expand or grow in a direction at right angles to the direction of inclination of the corrugations and therefore to expand both radially and circumferentially against the sealing surfaces. Oppositely inclining adjacent strips assures a uniform overall expansion force in all sealing directions.

Figure 3:
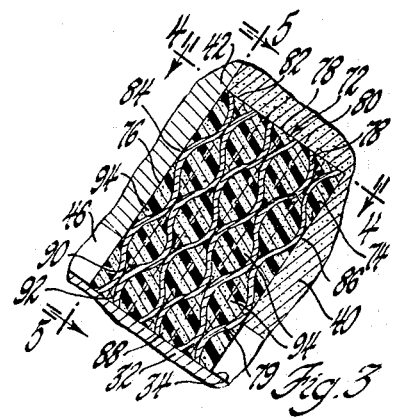
FIGURE 3 is an enlarged view of a detail of FIG. 2.
Figure 4:
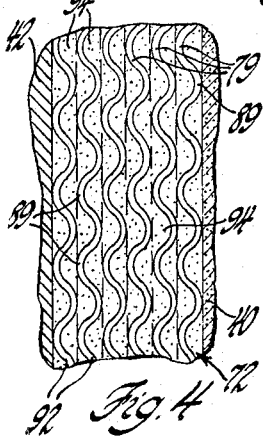
FIGURE 4 is a cross sectional view taken on a plane indicated by and viewed in the direction of the arrows 4—4 of FIG. 3; and, FIGURE 5 is a cross sectional view taken on a plane indicated by and viewed in the direction of the arrows 5—5 of FIG. 3.

The spaces 94 between corrugations are filled (FIGS. 3 and 4) with a high heat resistant elastomer that not only insulates the strips from the exhaust gases but binds the strips together to form a solid ring. The elastomer could be, for example, polyurethane having a filler such as boron nitride. The elastomer ring seals against the end and side walls of the groove 74 as well as at its outer edges in contact with the nozzle stationary spherical surface 34.

Thus, the construction described provides an elastic sealing ring sealing the leak of gas through passage 46 both radially and axially and eliminating the need for a back-up or expander ring to insure adequate sealing pressure. The two directional resiliency of the strips due to the inclined corrugations effects the sealing in two directions.

The operation of the nozzle and seal is believed to be clear from the description and drawings, and therefore will not be given in detail. Suffice it to say, however, that the natural resiliency of the corrugated strips 78 causes the elastomer 94 to be pressed against the walls 84 and 86 and end 82 of groove 74, as well as against surface 34 into sealing contact with both nozzle portions as described. With or without vectoring of the nozzle, the exhaust gases pass through the nozzle at an eventual temperature of, say, 6000° F., for example, with some of the gases passing into the passage 46 where they are blocked by the seal 72. The force of the gas pressure against the seal, as well as the heat thereagainst, attempts to flatten the corrugations 89 resulting in merely seating the strips more firmly against the sealing surfaces. When the nozzle vectors, the elastomer and edges 88 of the strips slide along the spherical surface 34, and are maintained pressed against it by the resiliency of the strips. Wear of edges 88 merely permits the radial growth or expansion of the strips radially outwardly to maintain the sealing contact at surface 34.

After a predetermined time, of course, the heat dam and seal 72 will begin to char and volatilize and eventually expose the bag seal to the high gas temperature. However, by this time, the nozzle operation is substantially completed. Therefore, it is only necessary that the bag seal be able to withstand the intense heat for a short time, which it does. It is to be noted that the laminated construction provided by the filler strips overlapping the plates further delays the burnout of the seal. Thus, the seal 72 effectively prevents the leak of gas through the passage 46 thereby preventing the burnout of the bag seal 48.

From the foregoing, therefore, it will be seen that the invention provides a combination heat dam and gas seal effectively insulating the vectoring nozzle main gas seal from the intense heat of the exhaust gases to permit operation of the nozzle for as long a time as is necessary.

While a specific number of seal strips are indicated for clarity, it will be clear that other combinations could be used without departing from the scope of the invention. Also, it is within the scope of the invention to substitute other materials for those indicated. Furthermore, while the invention has been illustrated in the drawings, which are essentially to scale, in connection with an exhaust gas jet nozzle, it will be clear to those skilled in the arts to which this invention pertains that many modifications may be made thereto without departing from the scope of the invention, and that it has use in many installations other than that illustrated.

I claim:

1. An expandable seal member for use between two spaced surfaces comprising a plurality of thin plates each having a width narrow in comparison to its length, said plates being stacked together face to face and positioned as a group between said surfaces with their opposite edges contacting said surfaces, said plates each being corrugated in a diagonal direction with respect to the length and width of each plate, the inclination of said corrugations permitting expansion of each of said plates simultaneously in directions along both their length and width, the spaces between said corrugations being filled with an elastomer binding said plates together.

2. An expandable ring seal member for use between two radially spaced annular surfaces comprising a plurality of thin annular plates extending around one of said surfaces and across the space between surfaces, sealingly contacting said surfaces, said plates being axially stacked one against the other, each of said plates being corrugated in a generally radial direction, the corrugation of each plate being inclined with respect to a radial line from the axis of said plate through the said corrugation, said inclination permitting the expansion of each of said plates simultaneously in both a radial and circumferential direction to seal said member against said surfaces.

3. A vectoring fluid jet propulsion nozzle, having vectoring and stationary portions and a fluid leakage passage therebetween, and an expandable heat dam and fluid seal ring in said passage between said portions to prevent the leakage of heat and fluid along said passage, said ring comprising a plurality of thin annular plates extending around one of said surfaces and across the space between said surfaces, sealingly contacting said surfaces, said plates being axially stacked one against the other, each of said plates being corrugated in a generally radial direction, the corrugation of each plate being inclined with respect to a radial line from the axis of said plate through the said corrugation, said inclination permitting the expansion of each of said plates simultaneously in both a radial and circumferential direction to seal said ring member against said surfaces.

4. A vectoring fluid jet propulsion nozzle having vectoring and stationary portions and a fluid leakage passage therebetween, and an expandable heat dam and fluid seal ring in said passage between said portions to prevent the leakage of heat and fluid along said passage, said ring comprising a plurality of thin annular plates extending around one of said surfaces and across the space between surfaces, sealingly contacting said surface, said plates being axially stacked one against the other, each of said plates being corrugated in a generally radial direction, the corrugation of each plate being inclined with respect to a radial line from the axis of said plate through the said corrugation, said inclination permitting the expansion of each of said plates simultaneously in both a radial and circumferential direction to seal said ring member against said surfaces, the spaces between said corrugations being filled with a heat resistant elastomer binding said corrugated plates together.

5. An expandable ring seal member for use between two radially spaced annular surfaces comprising a plurality of thin annular plates extending around one of said surfaces and across the space between said surfaces, sealingly contacting said surfaces, said plates being axially stacked one against the other, each of said plates being corrugated in a generally radial direction, the corrugation of each plate being inclined with respect to a radial line from the axis of said plate through the said corrugation, said inclination permitting the expansion of said plate simultaneously in both a radial and circumferential direction to seal said member against said surfaces, the spaces between said corrugations being filled with a heat resistant elastomer binding said corrugated plates together.

References Cited by the Examiner

UNITED STATES PATENTS

| | | | |
|---|---|---|---|
| 2,080,472 | 5/1937 | Grece | 277—44 |
| 2,573,225 | 10/1951 | Seamark | 277—235 |
| 3,032,982 | 5/1962 | Gaubatz | 60—35.6 |
| 3,048,977 | 8/1962 | Geary | 60—35.55 |

MARK NEWMAN, *Primary Examiner.*

SAMUEL FEINBERG, *Examiner.*

G. L. PETERSON, *Assistant Examiner.*